United States Patent
Yoshida et al.

(10) Patent No.: US 6,409,620 B1
(45) Date of Patent: Jun. 25, 2002

(54) BELT FOR CONTINUOSLY VARIABLE TRANSMISSION

(75) Inventors: Hideaki Yoshida; Takamichi Shimada, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/615,053

(22) Filed: Jul. 12, 2000

(30) Foreign Application Priority Data

Jul. 13, 1999 (JP) ............................. 11-198615

(51) Int. Cl.$^7$ ............................. F16G 5/16; F16G 1/22
(52) U.S. Cl. ................... 474/242; 474/201; 474/240
(58) Field of Search ................ 474/242, 201, 474/245, 244, 243, 240, 237

(56) References Cited

U.S. PATENT DOCUMENTS

| 4,552,548 A | * 11/1985 | Hattori ............... 474/201 |
| 4,689,038 A | * 8/1987 | Henderson ............ 474/242 |
| 4,826,473 A | 5/1989 | Miyawaki |
| 4,838,845 A | * 6/1989 | Hattori et al. ........ 474/242 |
| 4,894,049 A | * 1/1990 | Koppelaars .......... 474/240 |
| 4,900,296 A | * 2/1990 | Schmidt ............. 474/242 |
| 5,374,223 A | * 12/1994 | Hendriks ............ 474/242 |

FOREIGN PATENT DOCUMENTS

| EP | 0278545 | 8/1988 |
| EP | 0460721 | 12/1991 |
| JP | 4-362338 | 12/1992 |
| JP | 5-37068 | 9/1993 |

* cited by examiner

*Primary Examiner*—David A. Bucci
*Assistant Examiner*—Marcus Charles
(74) *Attorney, Agent, or Firm*—Arent Fox Kintner Plotkin & Kahn, PLLC

(57) ABSTRACT

In a section near a rocking edge of each of metal elements used in a metal belt for a continuously variable transmission, a pair of protrusions are formed at laterally opposite ends of a front main surface opposed to a preceding metal element, and flat surface portions are formed on a rear main surface opposed to a succeeding metal element. The metal elements can be wound in a correct attitude around a pulley without being yawed by the contact of the protrusions and the flat surface portions with each other, whereby they can be prevented from being damaged. Further the metal elements contacting with each other in a chord section of the metal belt can slide laterally. Thus, a misalignment between a drive pulley and a driven pulley can be absorbed.

7 Claims, 14 Drawing Sheets

BELT FOR CONTINUOSLY VARIABLE TRANSMISSION

BACKGROUND OF THE INVENTION

1. Field of the Invention

The present invention relates to a belt for a continuously variable transmission, comprising a plurality of metal elements, each of which has front and rear main surfaces for contact with adjacent ones of metal elements, and which are supported on a metal ring assembly with the rear main surface of the preceding metal element being in contact with the front main surface of the succeeding metal element. The belt is wound around a drive pulley and a driven pulley to transmit a driving force between the pulleys.

2. Description of the Prior Art

Figure 13:
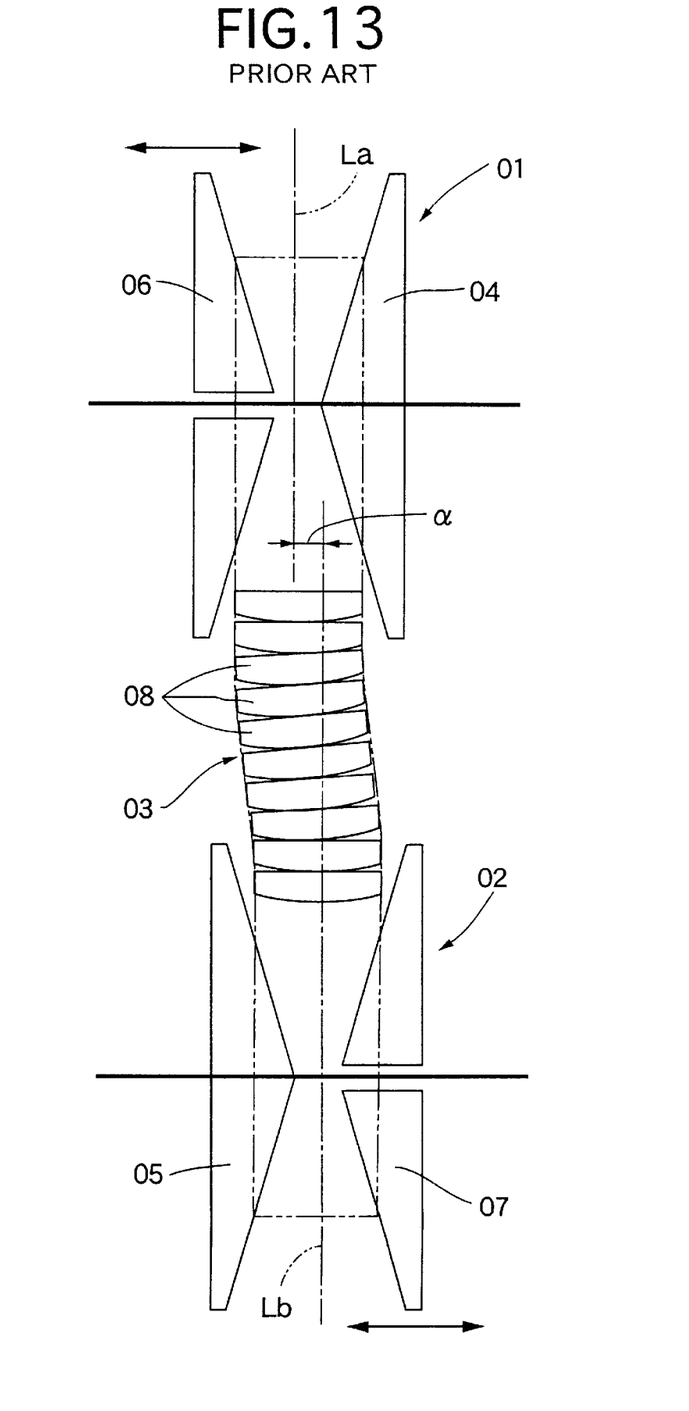
FIG. 13 is a view for explaining the absorption of the misalignment due to the yawing of the prior art metal elements.

As shown in FIG. 13, in a belt-type continuously variable transmission having a metal belt 03 wound around a drive pulley 01 and a driven pulley 02, a stationary pulley half 04 of the drive pulley 01 and a stationary pulley half 05 of the driven pulley 02 are positioned in diagonal positions, and a movable pulley half 06 of the drive pulley 01 and a movable pulley half 07 of the driven pulley 02 are positioned in diagonal positions. Therefore, when the movable pulley halves 06 and 07 of the drive pulley 01 and the driven pulley 02 are moved toward or away from the stationary pulley halves 04 and 05, the center line La of a V-groove in the drive pulley 01 and the center line Lb of a V-groove in the driven pulley 02 are misaligned with each other to produce a small misalignment $\alpha$ (usually equal to or smaller than 1 mm).

There is a continuously variable transmission known from Japanese Patent Application Laid-open No. 4-362338, in which in order to wind a metal belt 03 around the drive pulley 01 and the driven pulley 02 with such misalignment a absorbed, at least one of front and rear contact surfaces of the metal elements 08 forming the metal belt 03 is formed into an arcuate shape, whereby a relative yawing between the metal elements 08 contacting with each other is made possible.

Figure 14:
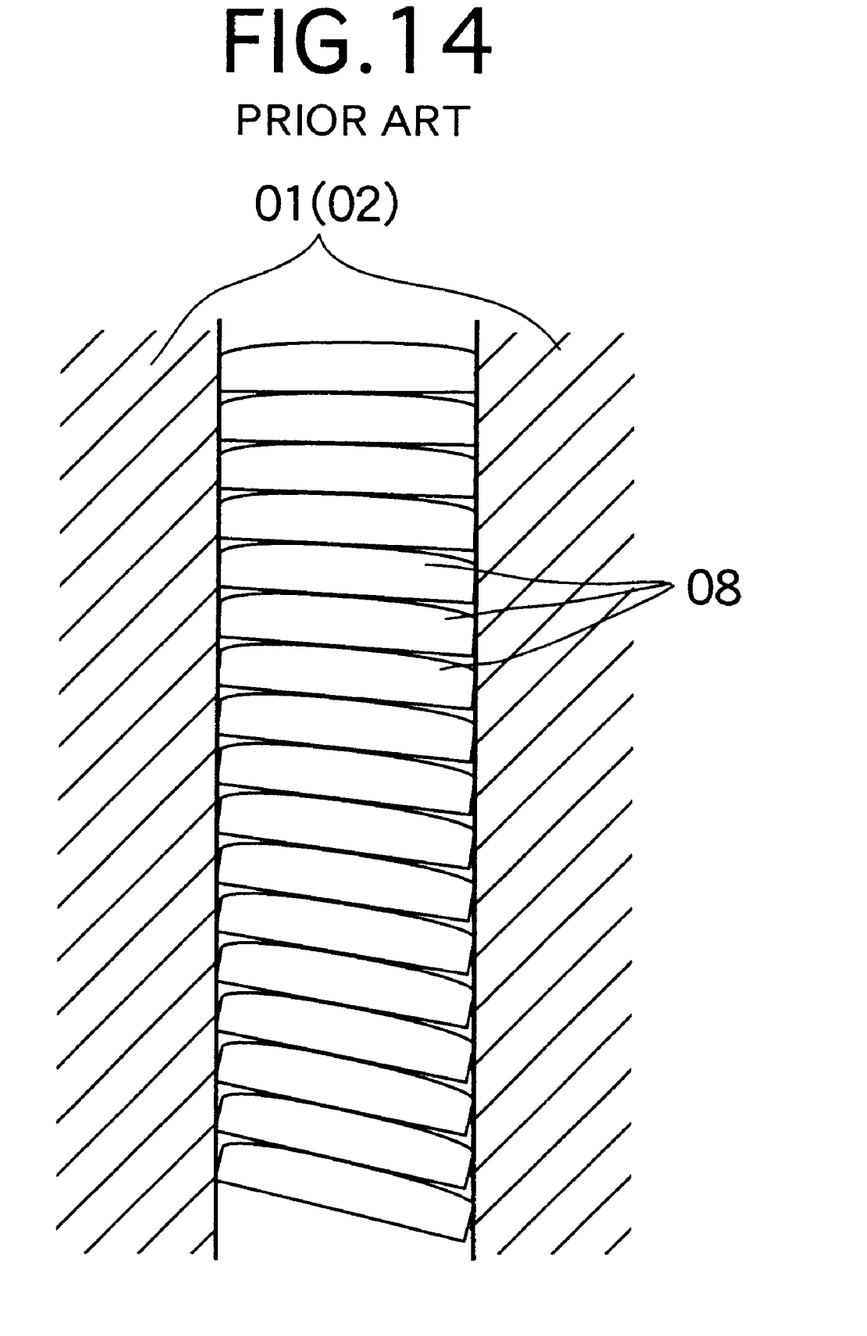
FIG. 14 is a view showing the prior art metal elements in a state in which they have been wound around a pulley.

However, the continuously variable transmission described in Japanese Patent Application Laid-open No., 4-362338 suffers from a problem that when the metal elements 08 are wound around the pulley 01 or 02 as shown in FIG. 14, such metal elements 08 are yawed, because relative yawing between the metal elements 08 is possible. This causes a large load to be produced between the metal element 08 and a V-face of the pulley 01 or 02, resulting in a degraded durability.

There is also a continuously variable transmission known from Japanese Utility Model Publication No. 5-37068, in which each front and rear main surface of a metal element is formed into a corrugated sectional shape, wherein the corrugated main surface of the preceding metal element and the corrugated main surface of the succeeding metal element are fitted with each other. In this continuously variable transmission, the relative yawing between the metal elements is prevented and hence, a large load can be prevented from being produced between the metal elements and the V-face of a pulley, thereby providing an enhanced durability.

However, the continuously variable transmission described in Japanese Utility Model Publication No. 5-37068 suffers from a problem that it is difficult to absorb a misalignment produced between the drive pulley and the driven pulley, because the relative yawing between the metal elements is inhibited, and the relative lateral sliding movement between the metal elements is inhibited.

If the entire main surface of each of the metal elements is formed into a completely flat surface, it is possible to prevent adjacent ones of the metal elements from being yawed relative to each other in a state in which they have been wound around the pulley, thereby providing an enhanced durability, and it is possible to permit the relative lateral sliding movement of the adjacent ones of the metal elements in a chord section between the pulleys, thereby absorbing the misalignment. However, it is difficult to form such a metal element only by a punching process, and it is difficult in respect of the cost to finish the main surface into a flat shape by subjecting the metal element to cutting or machining after the punching.

SUMMARY OF THE INVENTION

Accordingly, it is an object of the present invention to ensure that the yawing of the metal elements can be prevented, while enabling the absorption of the misalignment by designing the shape of main surfaces of the metal element.

To achieve the above object, according to the present invention, there is provided a belt for a continuously variable transmission having a drive pulley and a driven pulley, comprising a plurality of metal elements, each of which has front and rear main surfaces capable of being brought into contact with adjacent ones of metal elements, and which are supported on a metal ring assembly with the rear main surface of a preceding metal element being in contact with the front main surface of a succeeding metal element. The belt is wound around the drive pulley and the driven pulley to transmit a driving force between the pulleys. One of the front and rear main surfaces of the metal elements has protrusions projecting forwards or rearwards, formed at predetermined locations at laterally opposite ends in a region near a rocking edge, respectively, and the other of the front and rear main surfaces of the metal elements has flat surface portions with which the protrusions are in contact, the flat surface portions being formed at least at laterally opposite ends in a region near a rocking edge, respectively, so that they are perpendicular to the forward and rearward directions.

With the above arrangement, the rear main surface of the preceding metal element and the front main surface of the succeeding metal element are in contact with each other at the protrusions which project forwards or rearwards on one of the front and rear main surfaces at the predetermined locations, at the laterally opposite ends, in the region near the rocking edge, and at the flat surface portions formed on the other main surface, at least at the laterally opposite ends in the region near the rocking edge. Therefore, the metal elements can be wound around each of the pulleys in a correct attitude without yawing, whereby they can be prevented from being damaged. In addition, the flat surface portions on the other main surface are formed, so that they are perpendicular to the forward and rearward directions and hence, the protrusions of one of the front and rear main surfaces can freely slide laterally with respect to the flat surface portions. Therefore, even if misalignment occurs between the drive pulley and the driven pulley, the metal elements can freely slide laterally and be brought into engagement with the drive pulley or the driven pulley in a correct attitude.

The above and other objects, features and advantages of the invention will become apparent from the following description of the preferred embodiment taken in conjunction with the accompanying drawings.

BRIEF DESCRIPTION OF THE DRAWINGS

FIGS. 1 to 5 show a first embodiment of the present invention, wherein:

FIGS. 7A to 11 show a fourth embodiment of the present invention, wherein:

DESCRIPTION OF THE PREFERRED EMBODIMENTS

The present invention will now be described by way of embodiments with reference to the accompanying drawings.

FIGS. 1 to 5 show a first embodiment of the present invention.

Figure 2:
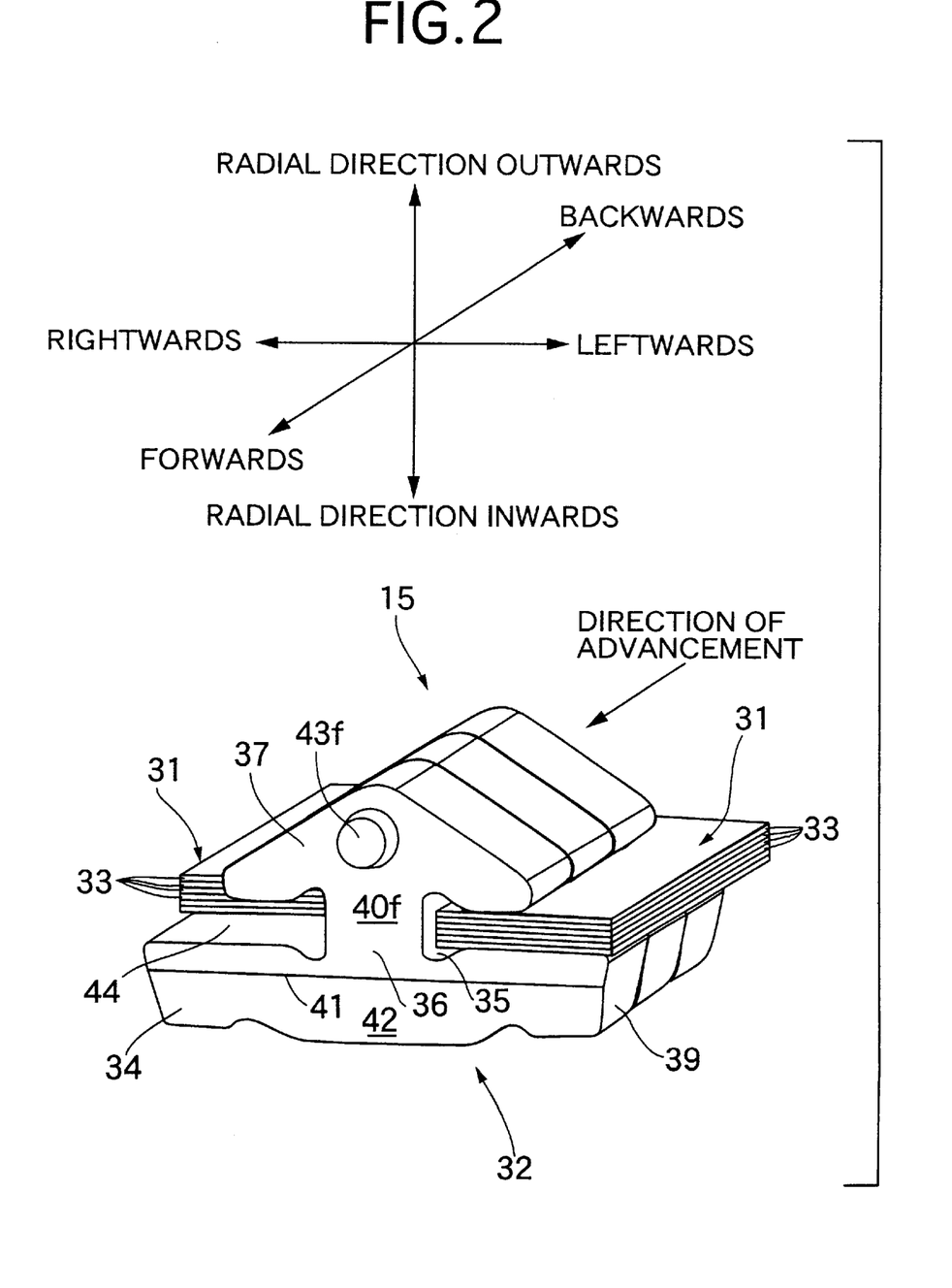
FIG. 2 is a partial perspective view of a metal belt.

The definition of forward and backward directions, lateral direction and radial direction of a metal element used in the embodiments is shown in FIG. 2. The radial direction is defined as the radial direction of a pulley against which the metal element abuts. A location closer to the axis of revolution or rotation of the pulley is a radially inner location, and a location farther from the axis of revolution of the pulley is a radially outer location. The lateral direction is defined as the direction along the axis of revolution of the pulley against which the metal element abuts. The forward and backward directions are defined as directions along the direction of advancement of the metal element during forward traveling of a vehicle.

Figure 1:
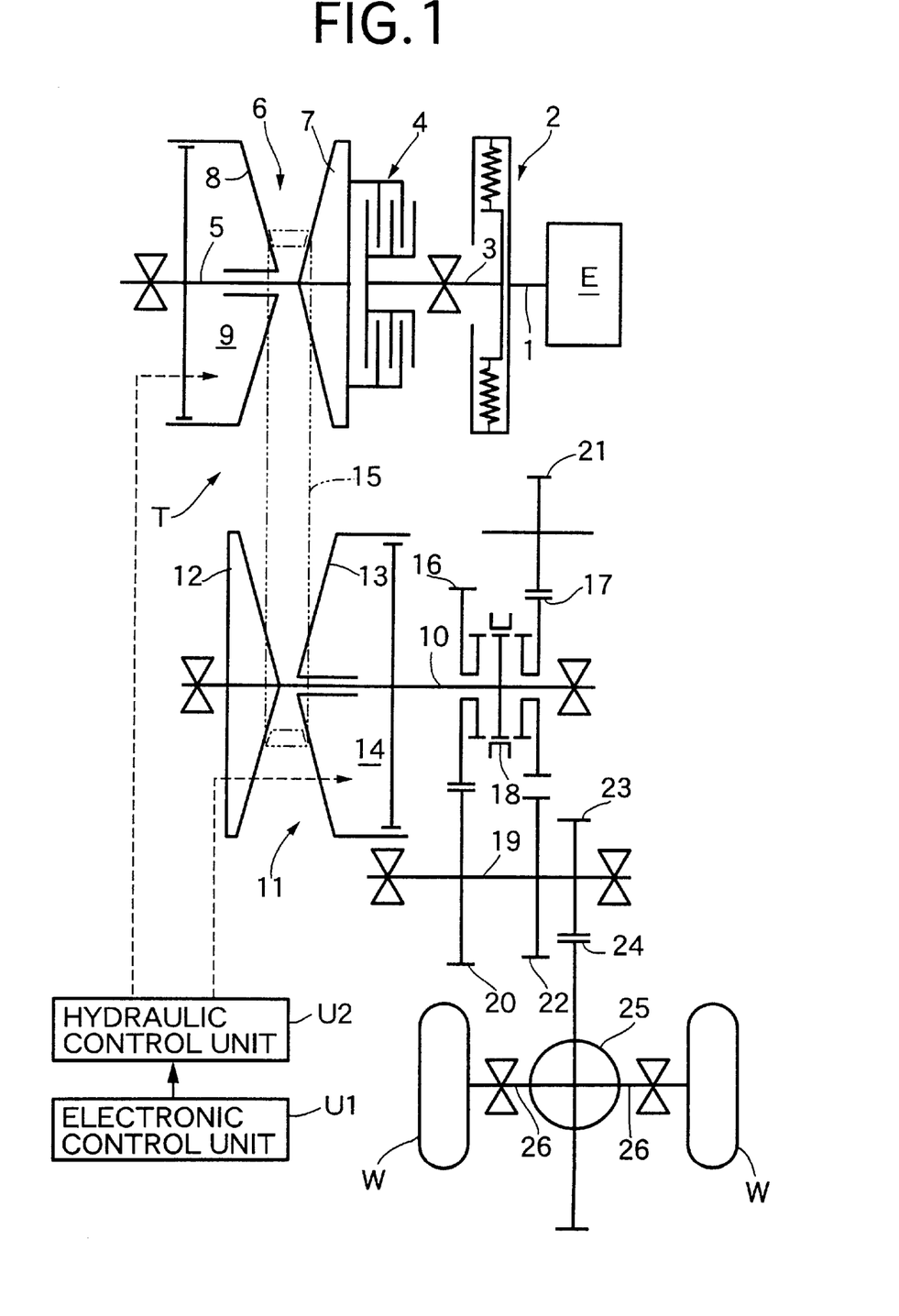
FIG. 1 is a skeleton illustration of a power transmitting system for a vehicle equipped with a continuously variable transmission.

FIG. 1 schematically shows the structure of a metal belt type continuously variable transmission T mounted in an automobile. An input shaft 3 connected to a crankshaft 1 of an engine E through a damper 2, is connected to a drive shaft 5 of the metal belt type continuously variable transmission T through a start clutch 4. A drive pulley 6 provided on the drive shaft 5 includes a stationary pulley half 7 secured to the drive shaft 5, and a movable pulley half 8 which can be moved toward and away from the stationary pulley half 7. The movable pulley half 8 is biased toward the stationary pulley half 7 by hydraulic pressure applied to an oil chamber 9.

A driven pulley 11 is provided on a driven shaft 10 positioned parallel to the drive shaft 5, and includes a stationary pulley half 12 secured to the driven shaft 10, and a movable pulley half 13 which can be moved toward and away from the stationary pulley half 12. The movable pulley half 13 is biased toward the stationary pulley half 12 by hydraulic pressure applied to an oil chamber 14. A metal belt 15 is wound around the drive pulley 6 and the driven pulley 11 (see FIG. 2). The metal belt 15 comprises a large number of metal elements 32 supported on a pair of left and right metal ring assemblies 31, 31. Each of the metal ring assemblies 31, 31 comprises twelve metal rings 33 which are laminated one on another.

A forward drive gear 16 and a backward drive gear 17 are rotatably supported on the driven shaft 10. The forward and backward drive gears 16 and 17 can be coupled selectively to the driven shaft 10 by a selector 18. A forward driven gear 20 meshed with the forward drive gear 16 and a backward driven gear 22 meshed with the backward drive gear 17 through a backward idling gear 21, are secured to an output shaft 19 which is disposed in parallel to the driven shaft 10.

The revolution or rotation of the output shaft 19 is input to a differential 25 through a final drive gear 23 and a final driven gear 24, and is transmitted therefrom through left and right axles 26, 26 to driven wheels W, W.

The driving force of the engine E is transmitted to the driven shaft 10 through the crankshaft 1, the damper 2, the input shaft 3, the start clutch 4, the drive shaft 5, the drive pulley 6, the metal belt 15 and the driven pulley 11. When forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

At that time, hydraulic pressure applied to the oil chamber 9 of the drive pulley 6 and the oil chamber 14 of the driven pulley 11 of the metal belt type continuously variable transmission T are controlled by a hydraulic pressure control unit $U_2$ which is operated by a command from an electronic control unit $U_1$, thereby adjusting the change gear ratio continuously or in a stepless manner. That is, if hydraulic pressure applied to the oil chamber 14 of the driven pulley 11 is increased relative to hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuously variable transmission T is varied toward "LOW" continuously or in the stepless manner. On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuously variable transmission T is varied toward "OD" continuously or in the stepless manner.

Figure 3:
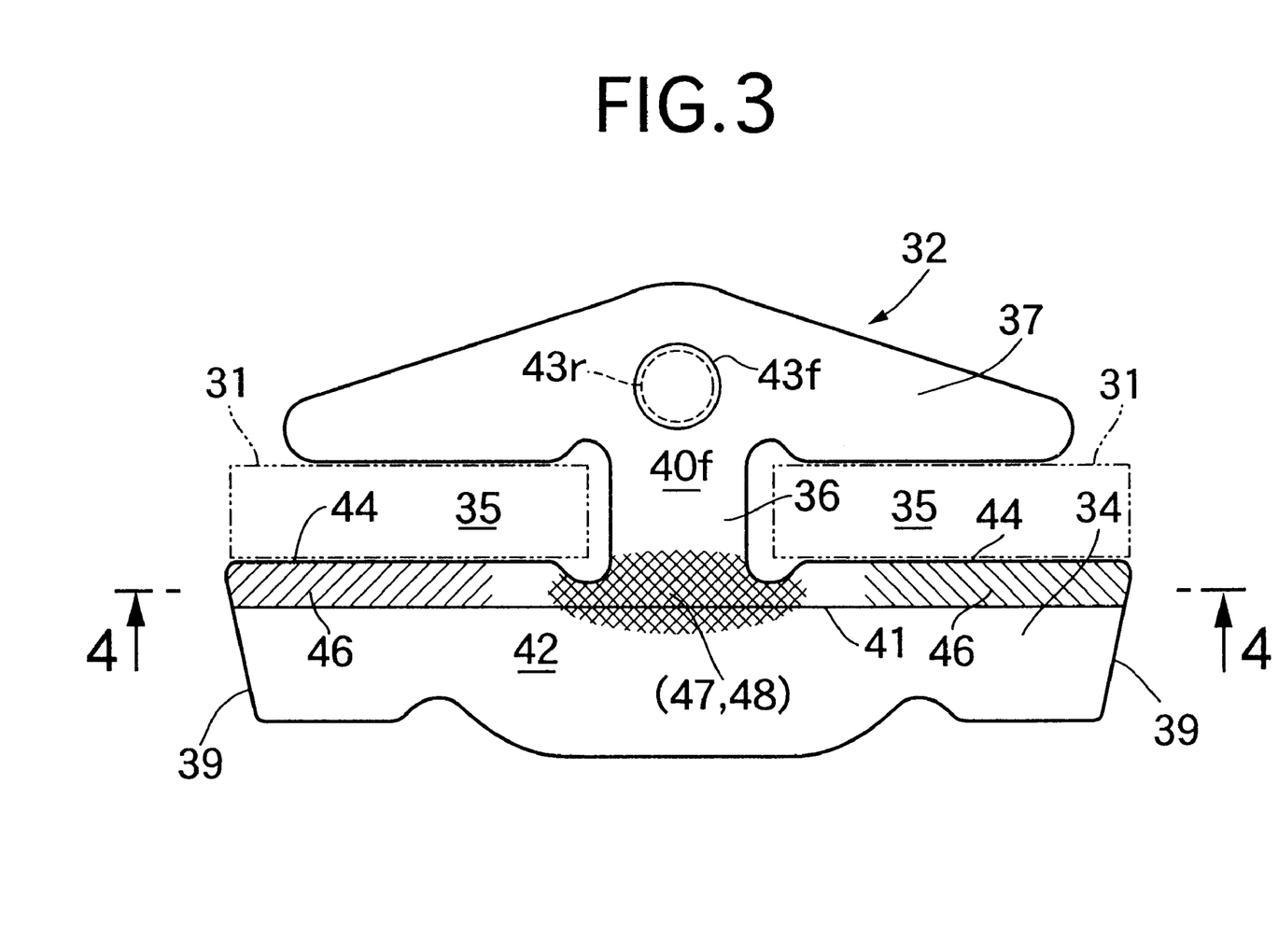
FIG. 3 is a front view of a metal element.
Figure 4:
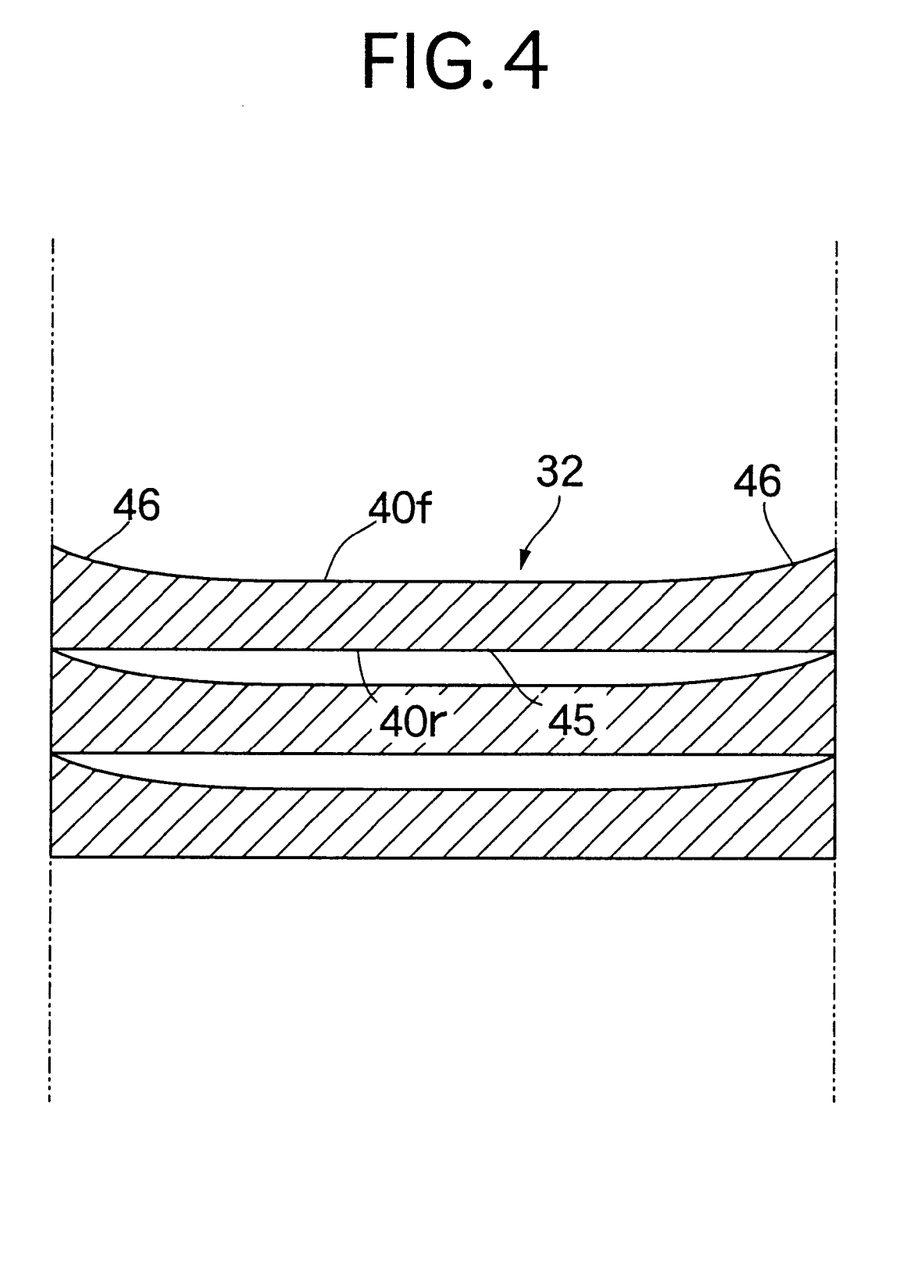
FIG. 4 is a sectional view taken along a line of 4—4 in FIG. 3.

As shown in FIGS. 2 to 4, each of the metal elements 32 which is formed from a metal plate by punching or stamping includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The element body 34 is formed at its laterally opposite ends with a pair of pulley abutment surfaces 39, 39 capable of abutting against V-faces of the drive pulley 6 and the driven pulley 11. The metal element 32 is formed, at its front and rear portions in the direction of advancement, with a pair of front and rear main surfaces 40f and 40r. An inclined surface 42 is formed below the front main surface 40f in the travel direction with a laterally extending rocking edge 41 located therebetween. Further, the ear 37 is formed, at its front and rear surfaces, with a projection 43f and a recess 43r which can be fitted to each other to connect the metal elements 32, 32 adjacent to each other in the forward and backward directions.

FIG. 4 shows a cross section in a region near the rocking edge 41 of the metal element 32, namely, a cross section in a region sandwiched between the rocking edge 41 and a saddle surface 44. The rear main surface 40r in the region near the rocking edge 41 of the metal element 32 is formed with a flat surface portion 45 perpendicular to the forward and rearward direction. On the other hand, the front main surface 40f in the region near the rocking edge 41 of the metal element 32 is formed at its lateral opposite ends with a pair of protrusions 46, 46 (see obliquely lined portions in FIG. 3). The lateral width of each of the protrusions, 46, 46 is set smaller than the width of each of the pair of saddle surfaces 44, 44, and the amount of forward projection of the protrusions 46, 46 is largest (approximately 10 μm) at the lateral opposite ends of the metal element 32 and is decreased therefrom toward the neck 36 down to 0 (zero). Such shape of the main surfaces 40f and 40r of the metal element 32 is formed by a punching or stamping die for forming the metal element 32. FIG. 4 shows a state in which no forward or rearward urging force is applied between the metal elements 32. When a forward or rearward urging force is applied, the protrusions 46, 46 are compressed, resulting in a decreased projection amount. When an urging force equal to or larger than a predetermined torque is applied, the front main surface 40f and the rear main surface 40r are brought into close contact with each other (see FIG. 7B).

When the metal elements 32 are wound around the drive pulley 6 or the driven pulley 11, they are opened radially with respect to an axis of the drive pulley 6 or the driven pulley 11, whereby the main surfaces 40f and 40r of the ear 37 are spaced apart from each other. However, in the region near the rocking edge 41, the metal elements 32 are maintained in a state in which the flat surface portion 45 of the rear main surface 40r of the preceding metal element 32 is in contact with the left and right protrusions 46, 46 of the front main surface 40f of the succeeding metal element 32. When the rear main surface 40r and the front main surface 40f are brought into contact with each other in the above manner, the yawing of the metal elements 32 is inhibited, whereby the rocking edges 41 are maintained in parallel to each other and hence, the metal elements 32 are reliably prevented from being obliquely engaged with the V-face of the pulley 6 or 11 to become damaged, because the protrusions 46, 46 of the front main surface 40f are formed at the lateral opposite ends of the metal element 32.

Figure 5:
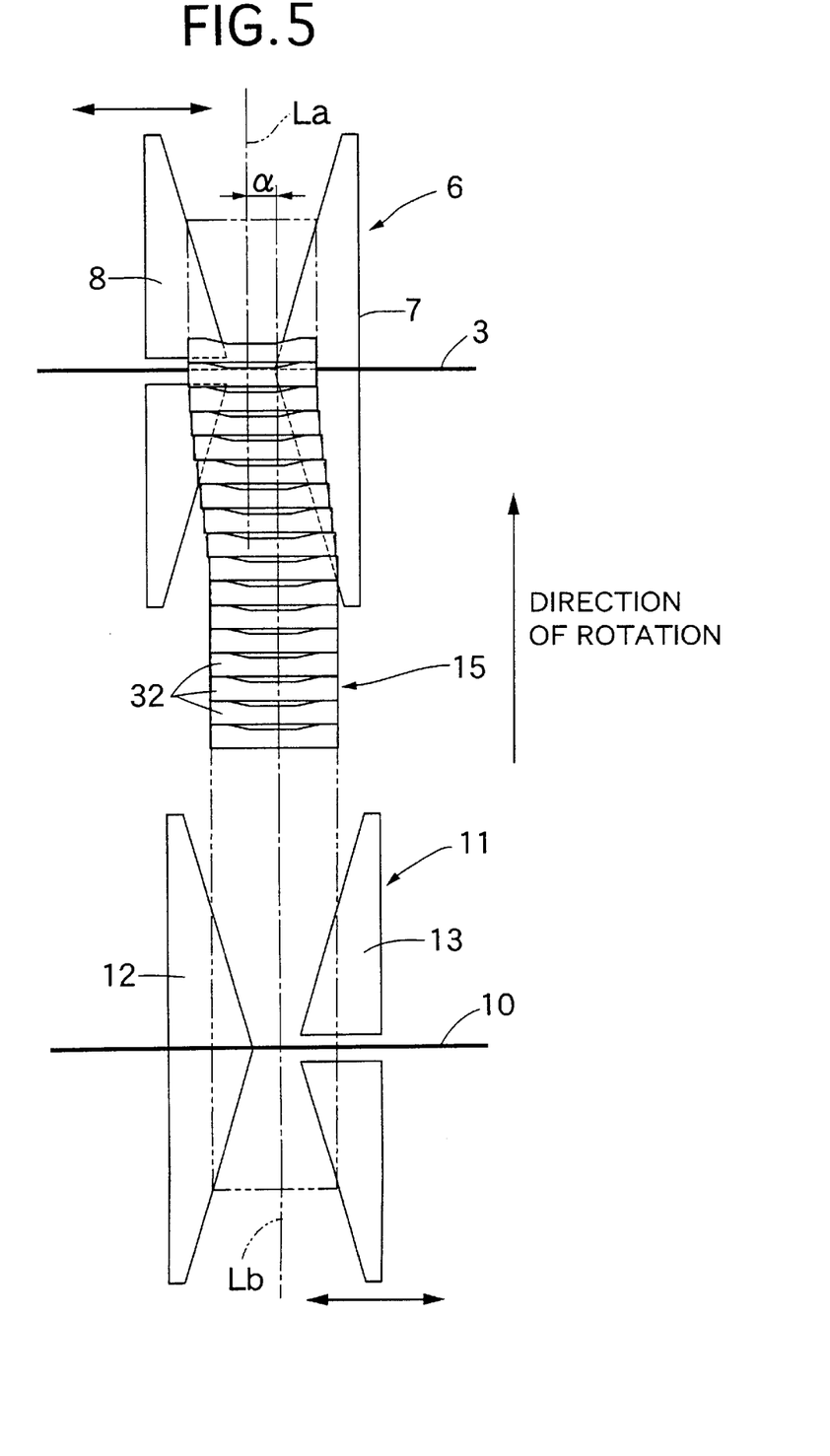
FIG. 5 is a view for explaining the absorption of a misalignment due to the lateral sliding movement of a metal ring.

The protrusions having a largest amount of projection of 10 μm at the lateral opposite ends of the metal element 32, are not completely crushed upon application of an urging force smaller than the predetermined torque to produce a gap between the adjacent metal elements 32 (see FIG. 5). When an urging force equal to or larger than the predetermined torque is applied, the protrusions are completely crushed, whereby the front main surface 40f and the rear main surface 40r are brought into close contact with each other (see FIG. 7B). Incidentally, FIG. 5 shows a state of the metal belt 15 which moves from the driven pulley 11 in the lower side in this figure toward the drive pulley 6 in the upper side, and the protrusions 46, 46 are provided on the front of the metal element 32 in the direction of advancement.

Even when the metal elements 32 exist in a chord section between an exit of the drive pulley 6 and an entrance of the driven pulley 11, the metal elements 32 are maintained in a state in which the flat surface portion 45 of the rear main surface 40r and the protrusions 46, 46 of the front main surface 40f are in contact with each other and hence, the transmission of power from the drive pulley 6 to the driven pulley 11 is conducted efficiently. When a misalignment is caused between the drive pulley 6 and the driven pulley 11, the protrusions 46, 46 of the front main surface 40f can slide smoothly relative to the flat surface portion 45 of the rear main surface 40r, because the flat surface portion 45 is formed, so that it is perpendicular to the forward and rearward directions. Therefore, as shown in FIG. 5, the preceding and succeeding metal elements 32 can move freely in parallel in the lateral direction by the sliding movement of the flat surface portion 45 and the protrusions 46, 46, whereby the misalignment can be absorbed reliably.

In the present embodiment, the positions of the protrusions 46, 46 of the metal elements 32 correspond to those of the lateral opposite ends of the metal element. Therefore, when the adjacent metal elements 32 are moved relative to each other in the lateral direction to absorb the misalignment, the protrusion 46 at one of the opposite ends of one of the metal elements 32 is displaced out of the rear main surface 40r of the other of the metal elements 32 and hence, the metal element 32 is slightly inclined, i.e., yawed. However, the angle of this inclination is very small, because the largest amount of projection of the protrusion 46 of the metal element 32 is as small as about 10 μm. Thus, the lateral smooth sliding movement of the metal elements 32 is not impeded.

Second and third embodiments of the present invention will be described below with reference to FIGS. 6A and 6B.

In the first embodiment, the flat surface portion 45 of the rear main surface 40r extends over the entire lateral region of the section near the rocking edge 41 of the metal element 32, as shown in FIG. 4. In the second embodiment shown in FIG. 6A, a pair of flat surface portions 45, 45 are formed in a laterally separated relation by formation of a recess 47 at a laterally central portion of a rear main surface 40r. In the third embodiment shown in FIG. 6B, a pair of flat surface portions 45, 45 are formed in a laterally separated relation by formation of a projection 48 at a laterally central portion of a rear main surface 40r. The recess 47 and the projection 48 are formed on the back side of a region indicated by mesh lines in FIG. 3. In this way, the flat surface portions 45, 45 of the rear main surfaces 40r may be provided in areas in which they are in contact with the protrusions 46, 46 of the front main surface 40f, namely, in areas enabling the adjacent metal elements 32 to slide laterally and smoothly. When the projection 48 as in the third embodiment is formed, it is necessary to suppress the height of the projection 48 to a lower level (equal to or less than approximately 5 µm), so that the contact between the protrusions 46, 46 and the flat surface portions 45, 45 is not obstructed.

A fourth embodiment of the present invention will be described below with reference to FIGS. 7A to 11.

Figure 7A:
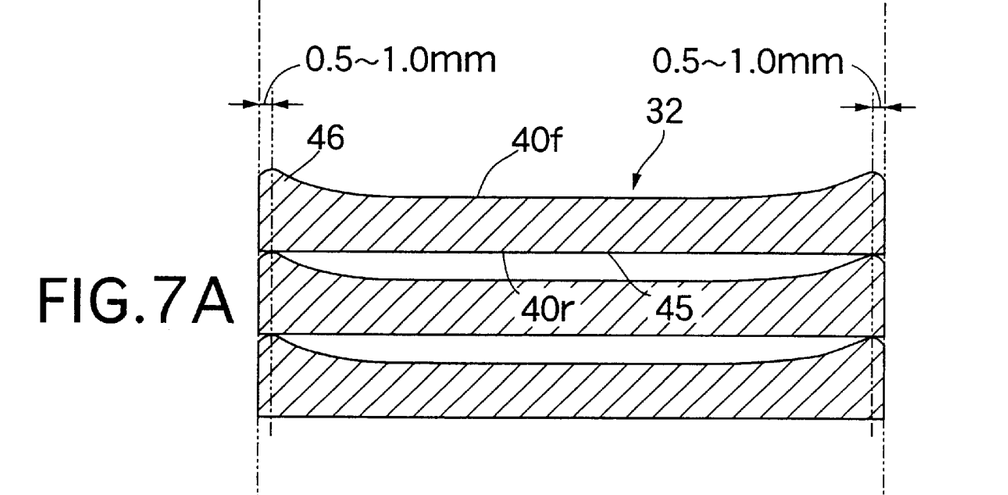
FIGS. 7A and 7B are diagrams showing the sectional shapes of metal elements.
Figure 7B:
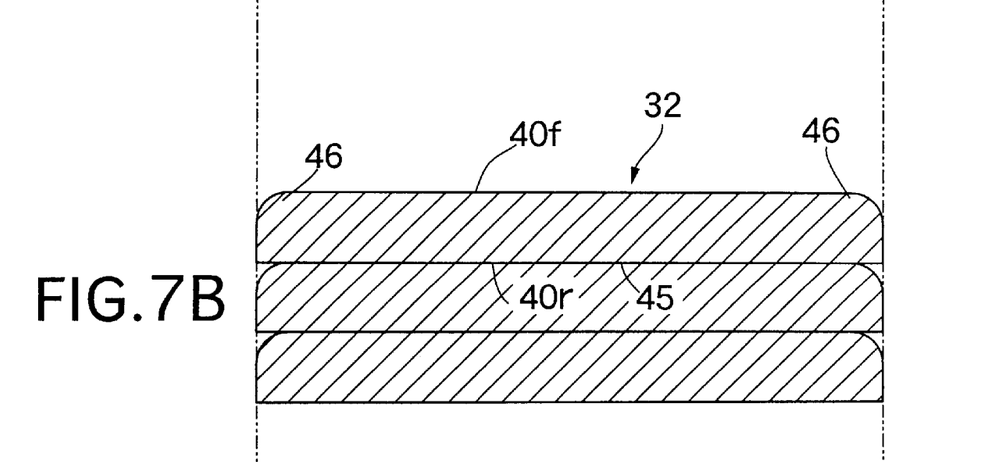
Figure 8:
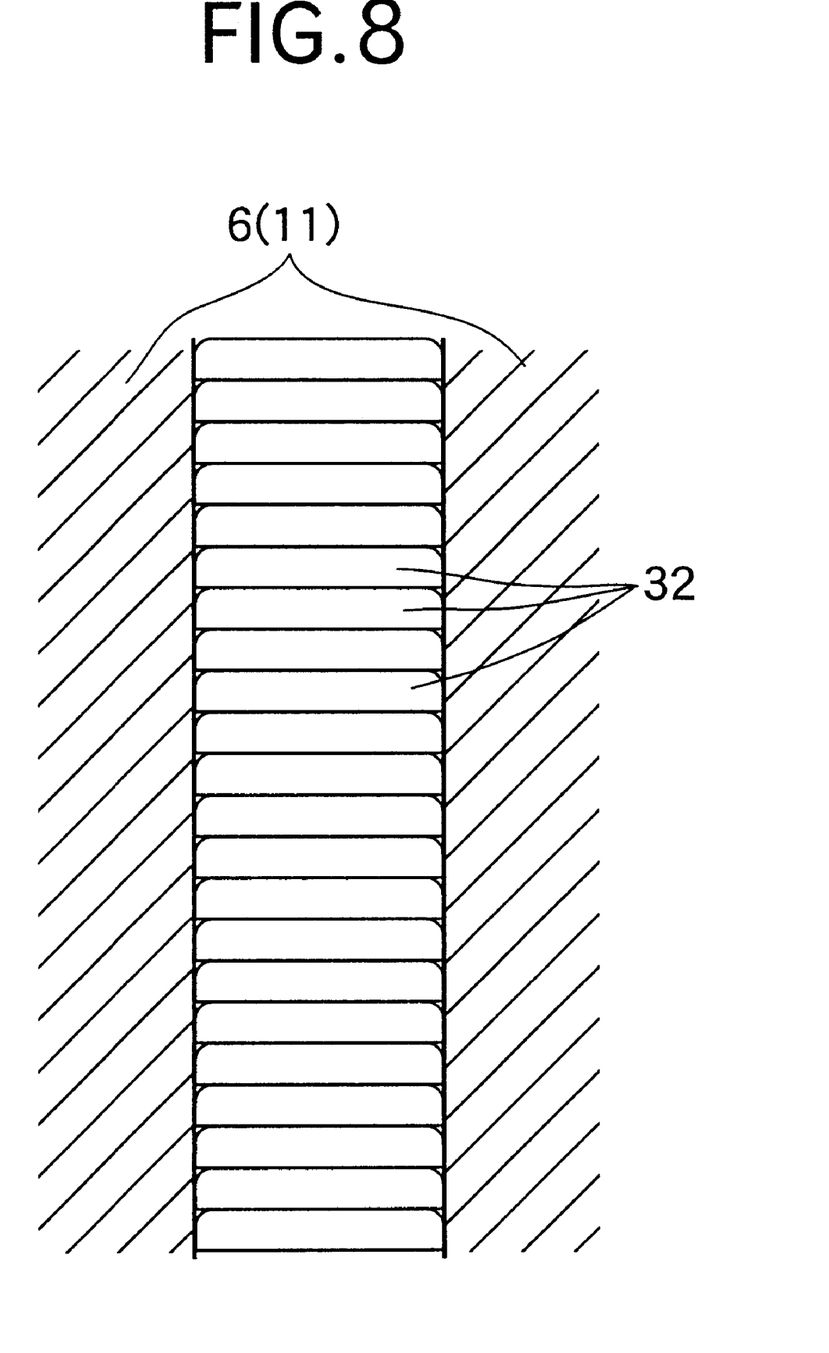
FIG. 8 is a diagram showing the metal elements in a state in which they have been wound around a pulley.

As can be seen from FIG. 7A, a metal element 32 in the fourth embodiment is an improvement in the metal element 32 in the first embodiment, and protrusions 46, 46 of the metal element 32 are rounded. More specifically, the metal element 32 is automatically rounded at the tip ends of the protrusions 46, 46 by barreling after a punching and hence, the peak point of each of the protrusions 46, 46 is formed at a location spaced slightly inwards (at a distance of about 0.5 to 1.0 mm) apart from each of the lateral opposite ends of the metal element 32. When a large compressive load is applied to the metal element 32 during transmission of the driving force, the protrusions 46, 46 are crushed into a flat shape to come into close contact with the flat surface portion 45 of the rear main surface 40r of the preceding metal element 32, as shown in FIG. 7B.

Figure 9:
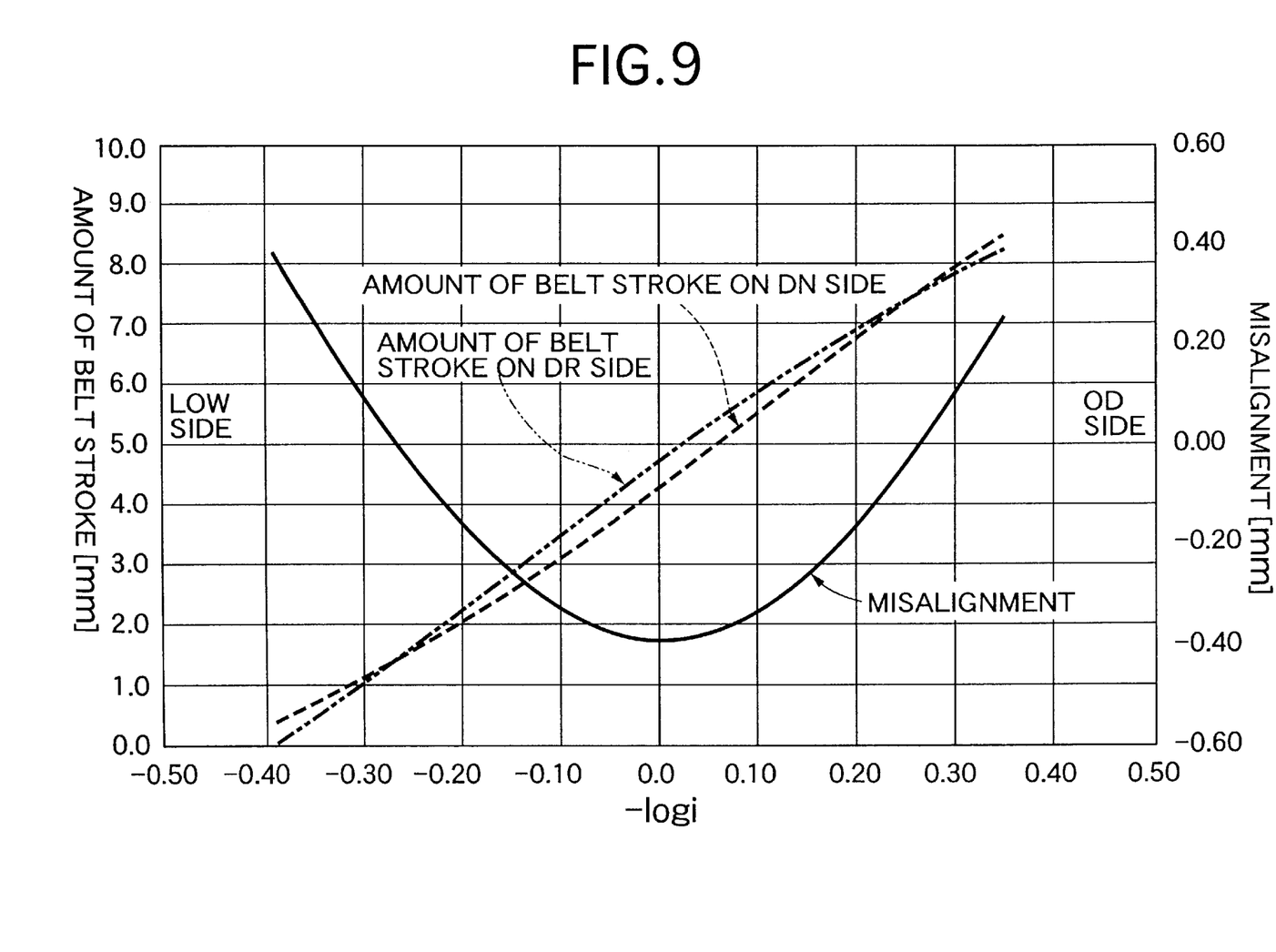
FIG. 9 is a graph showing the relationship between the belt stroke and the misalignment with respect to the gear ratio.
Figure 10:
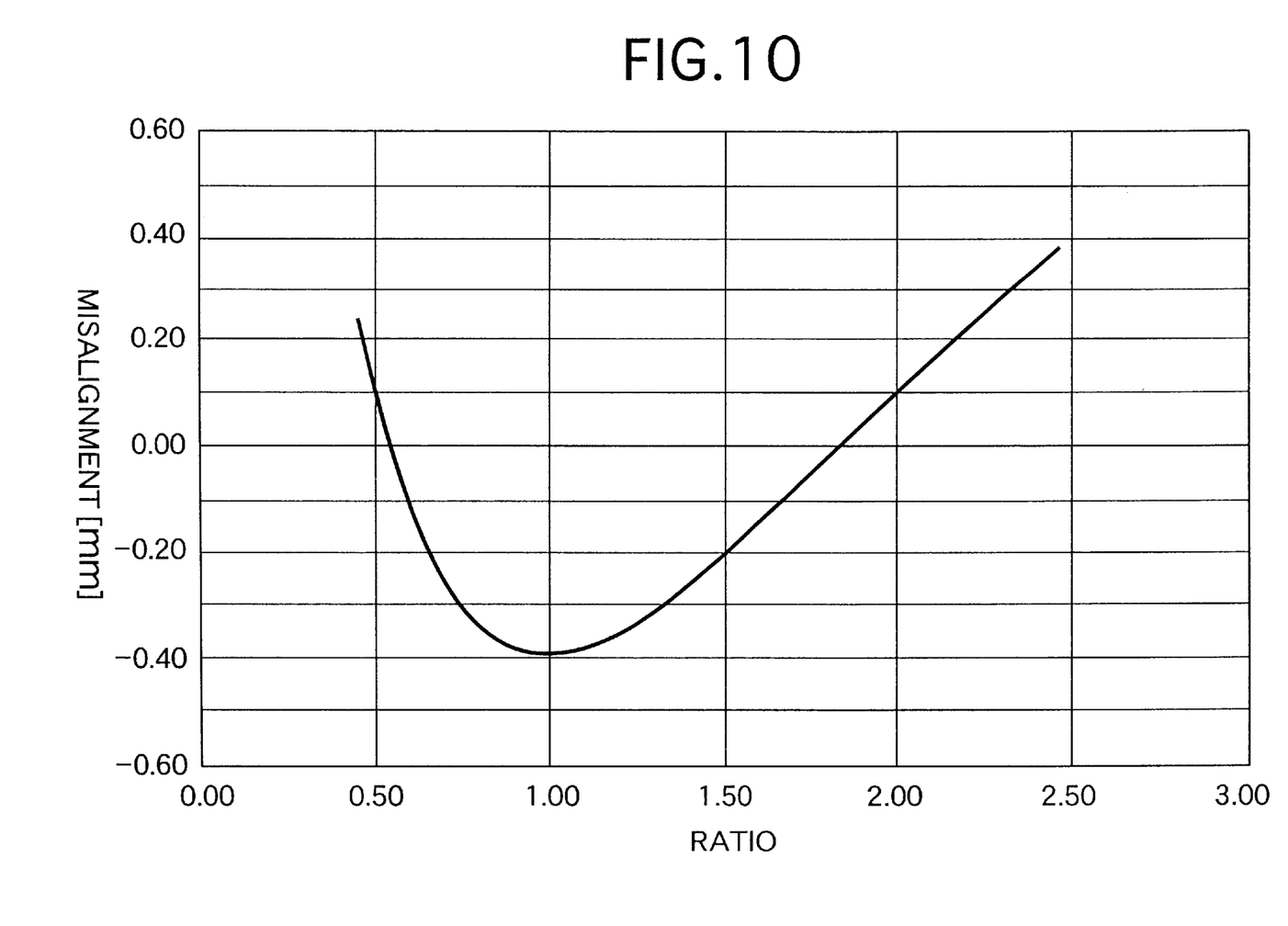
FIG. 10 is a graph showing the relationship of the misalignment with respect to the gear ratio.
Figure 11:
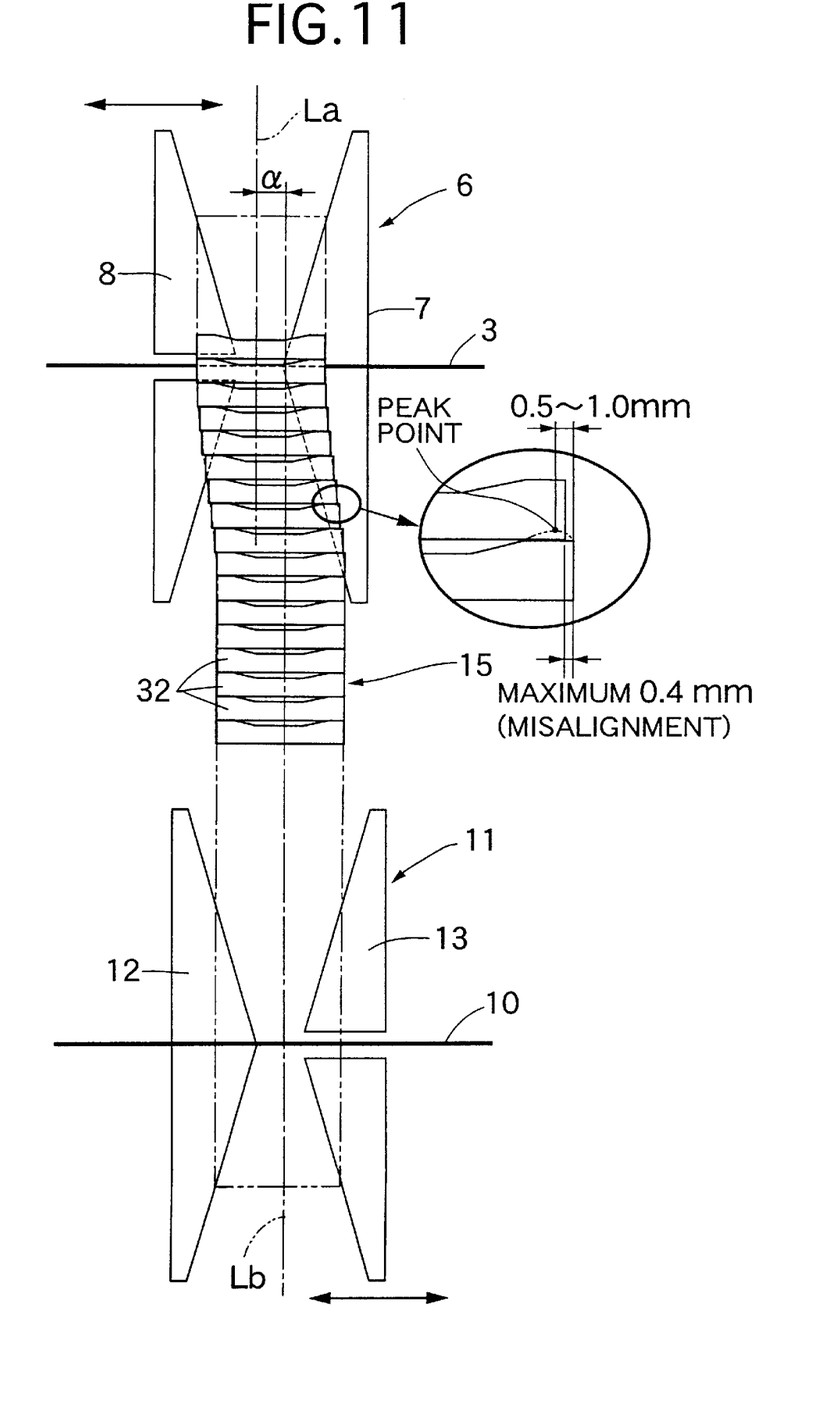
FIG. 11 is a view for explaining the absorption of the misalignment due to the lateral sliding movement of the metal elements.

The influence of the misalignment between the drive pulley 6 and the driven pulley 11 will be considered below with reference to FIGS. 5, 9 and 10. The misalignment between the drive pulley 6 and the driven pulley 11 is 0.4 mm in a state in which the gear ratio is "LOW", and is –0.4 mm in a state in which the gear ratio is 1. As a result, the maximum difference is equal to about 0.8 mm, and in addition, the misalignment is varied laterally 0.4 mm by 0.4 mm from a state in which the misalignment is 0 (zero). The plurality of metal elements 32 are moved relatively little by little in the lateral direction to absorb the misalignment, and hence, the amount of relative movement of the pair of adjacent metal elements 32 is smaller than 0.4 mm. Therefore, if the peak point of the protrusion 46 of each metal element 32 is formed at a location spaced inwards at a distance of about 0.5 to 1.0 mm apart from the lateral opposite ends of the metal element 32, as shown in FIG. 11, such peak point can be reliably brought into abutment against the flat surface portion 45 of the rear main surface 40r of the mating metal element 32 to further reliably prevent the inclination of the metal element 32.

Even when the metal elements 32 are brought into engagement with the V-face of the pulley 6 or 11, the yawing of the metal elements 32 is prevented, whereby the rocking edges 41 are maintained in parallel and thus, the metal elements 32 can be reliably prevented from being brought into oblique engagement with the V-face of the pulley 6 or 11 to become damaged.

Figure 12A:
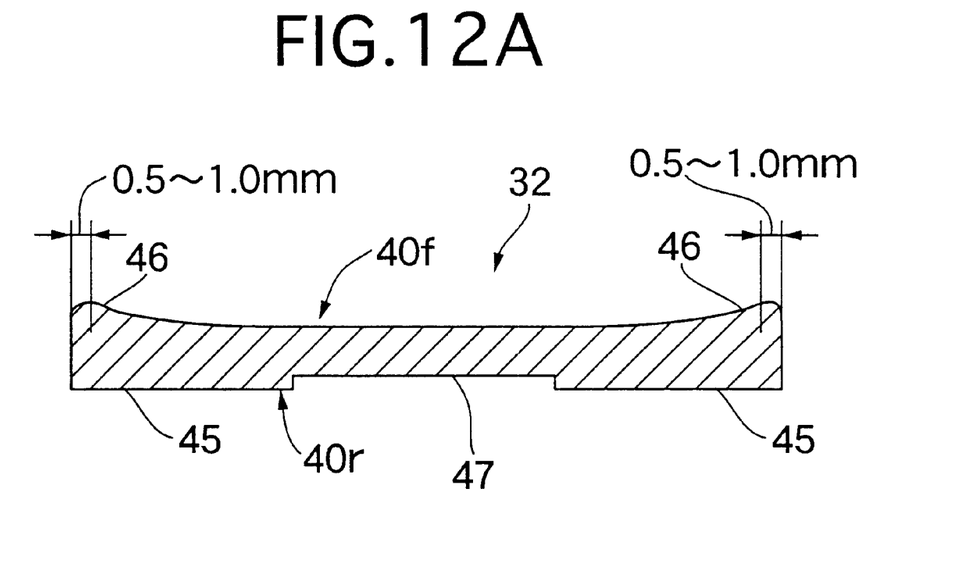
FIGS. 12A and 12B are diagrams showing the sectional shapes of metal elements according to fifth and sixth embodiments of the present invention.
Figure 12B:
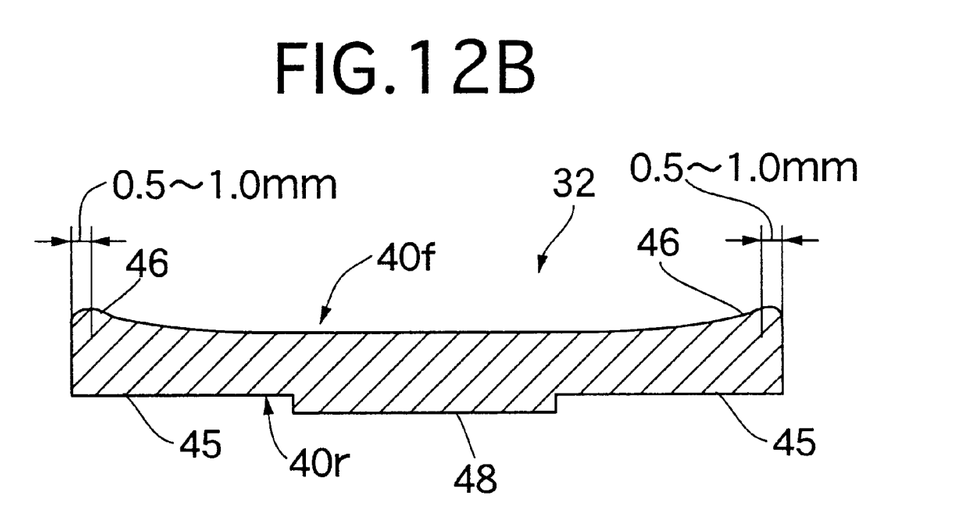

Fifth and sixth embodiments of the present invention will be described below with reference to FIGS. 12A and 12B.

Figure 6A:
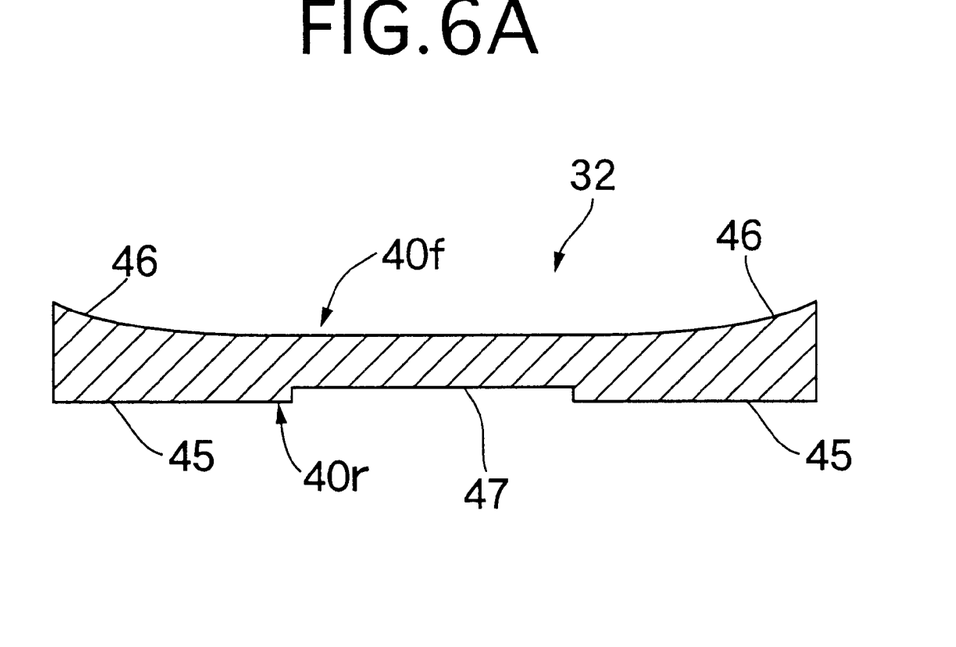
FIGS. 6A and 6B are diagrams showing the sectional shapes of metal elements according to second and third embodiments of the present invention.
Figure 6B:
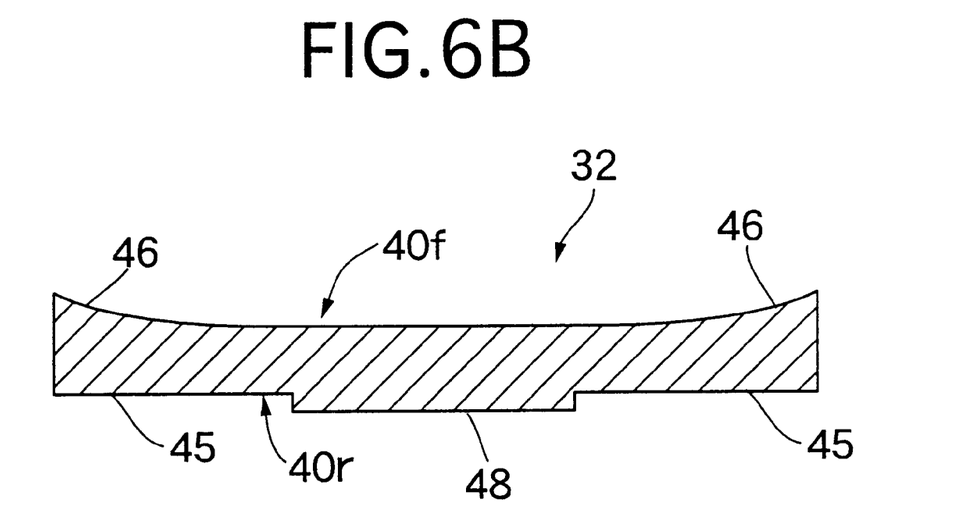

The fifth and sixth embodiments are improvements in the second and third embodiments shown in FIGS. 6A and 6B. In the fifth and sixth embodiments, protrusions 46, 46 are rounded, so that each of the peak points thereof are formed at a location spaced inwards at a distance of about 0.5 to 1.0 mm apart from each of the laterally opposite ends of a metal element 32. According to the fifth and sixth embodiments, a function and an effect similar to those in the fourth embodiment can be achieved.

In the embodiments, the protrusions 46, 46 are formed on the front main surface 40f of the metal element 32, and the flat surface portions 45, 45 are formed on the rear main surface 40r. Alternatively, the positional relation between the protrusions and the flat surface portions may be reversed, i.e., the protrusions 46, 46 may be formed on the rear main surface 40r, and the flat surface portions 45, 45 may be formed on the front main surface 40f.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A belt for a continuously variable transmission having a drive pulley and a driven pulley, comprising a metal ring assembly and a plurality of metal elements, each metal element having front and rear main surfaces for contact with adjacent ones of metal elements, said metal elements being supported on said metal ring assembly with the rear main surface of a preceding metal element being in contact with the front main surface of a succeeding metal element, said belt being wound around the drive pulley and the driven pulley to transmit a driving force between the drive pulley and the driven pulley, wherein the front main surface of said each metal element has protrusions projecting forward therefrom at predetermined locations with respect to laterally opposite ends in a region near a rocking edge of said each metal element, and the rear main surface of said each metal element has at least one flat surface portion, the protrusions contacting the flat surface portion of an adjacent metal element at least at laterally opposite ends in a region near the rocking edge, wherein said flat surface portion is perpendicular to the forward and rearward directions; and wherein said rocking edge of said each metal element permits relative rotation between said each metal element and said adjacent metal element by coming into contact with said adjacent metal element.

2. A belt for a continuously variable transmission having a drive pulley and a driven pulley, comprising a metal ring assembly and a plurality of metal elements, each metal element having front and rear main surfaces for contact with adjacent ones of metal elements, said metal elements being supported on said metal ring assembly with the rear main surface of a preceding metal element being in contact with the front main surface of a succeeding metal element, said belt being wound around the drive pulley and the driven pulley to transmit a driving force between the drive pulley and the driven pulley, wherein the rear main surface of said each metal element has protrusions projecting rearward therefrom at predetermined locations with respect to laterally opposite ends in a region near a rocking edge of said each metal element, and the front main surface of said each metal element has at least one flat surface portion, the protrusions contacting the flat surface portion of an adjacent metal element at least at laterally opposite ends in a region near the rocking edge, wherein said flat surface portion is perpendicular to the forward and rearward directions; and wherein said rocking edge of said each metal element permits relative rotation between said each metal element and said adjacent metal element by coming into contact with said adjacent metal element.

3. A belt as set forth in claim 1 or 2, wherein said protrusions are at the lateral ends of said metal elements.

4. A belt as set forth in claim 1 or 2, wherein said protrusions are at a predetermined distance from the lateral ends of said metal elements.

5. A belt as set forth in claim 1 or 2, wherein said at least one flat surface portion extends the entire length of said metal elements.

6. A belt as set forth in claim 1 or 2, wherein said at least one flat surface portion is one flat surface portion extending over less than the entire length of said metal elements.

7. A belt as set forth in claim 1 or 2, wherein said at least one flat surface portion is two flat surface portions.

* * * * *